United States Patent
Jeon et al.

(10) Patent No.: US 7,989,104 B2
(45) Date of Patent: Aug. 2, 2011

(54) BATTERY MODULE

(75) Inventors: Yoon-Cheol Jeon, Suwon-si (KR); Gun-Goo Lee, Suwon-si (KR); Tae-Yong Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1268 days.

(21) Appl. No.: 11/256,343

(22) Filed: Oct. 20, 2005

(65) Prior Publication Data

US 2006/0093899 A1    May 4, 2006

(30) Foreign Application Priority Data

Oct. 28, 2004   (KR) ......................... 10-2004-0086602
Oct. 28, 2004   (KR) ......................... 10-2004-0086603

(51) Int. Cl.
*H01M 2/10*   (2006.01)
*H01M 10/36*  (2010.01)
(52) U.S. Cl. ..................... 429/159; 429/160; 429/176
(58) Field of Classification Search .............. None
See application file for complete search history.

(56) References Cited

U.S. PATENT DOCUMENTS

| | | | | |
|---|---|---|---|---|
| 4,074,017 | A | * | 2/1978 | Kinsey ........................... 429/1 |
| 5,366,822 | A | * | 11/1994 | Korall et al. ................. 429/27 |
| 6,432,582 | B1 | | 8/2002 | Holden et al. |
| 6,586,132 | B1 | * | 7/2003 | Fukuda et al. ............... 429/120 |
| 6,645,668 | B2 | | 11/2003 | Etou |
| 6,835,099 | B2 | | 12/2004 | Lim |
| 2001/0031392 | A1 | | 10/2001 | Ogata et al. |

FOREIGN PATENT DOCUMENTS

| | | | |
|---|---|---|---|
| CN | 2267533 | Y | 11/1997 |
| CN | 1310482 | A | 8/2001 |
| JP | 2001-256934 | * | 9/2001 |
| JP | 2001-256941 | | 9/2001 |
| JP | 2001-297740 | * | 10/2001 |
| JP | 2001-297740 | A | 10/2001 |
| JP | 2002-134078 | A | 5/2002 |
| JP | 2003-024157 | | 1/2003 |
| JP | 3096981 | U | 1/2004 |
| JP | 2004-126847 | | 4/2004 |
| JP | 2004-126849 | | 4/2004 |
| JP | 2004-179141 | | 6/2004 |

(Continued)

OTHER PUBLICATIONS

Korean Patent Abstracts, Publication No. 10-1984-0000990, dated Mar. 26, 1984, in the name of Furukawa Patterry Co., Ltd.

(Continued)

*Primary Examiner* — John S Maples
(74) *Attorney, Agent, or Firm* — Christie, Parker & Hale, LLP

(57) ABSTRACT

A battery module includes a case with at least one face which is opened, a plurality of partition walls fixedly installed at predetermined intervals in the case, and a plurality of unit batteries which are separated from each other with the partition walls therebetween to be inserted into the case. The battery module may include a battery fixing structure which is installed between the case and the unit batteries to fix the unit batteries so as to prevent positional movement of the unit batteries in the case. The battery fixing structure may be a concavo-convex engaging structure including fixing projections and projection receiving portions.

12 Claims, 16 Drawing Sheets

FOREIGN PATENT DOCUMENTS

| KR | 1984-0000990 | 3/1984 |
|---|---|---|
| KR | 10-1998-0000990 | 3/1998 |

OTHER PUBLICATIONS

Patent Abstracts of Japan for Publication number: 2001-256934; Date of publication of application Sep. 21, 2001, in the name of Hayano Akihito et al.

SIPO Office action dated Oct. 9, 2009, for corresponding Chinese application 200810144877.2, with English translation.

Patent Abstracts of Japan and English machine translation of Japanese Publication 2001-256941, 15 pages.

Patent Abstracts of Japan, and English machine translation of Japanese Publication 2003-024157, listed above, 7 pages, Jan. 2003.

Patent Abstracts of Japan, and English machine translation of Japanese Publication 3096981 U, listed above, 21 pages, Jan. 2004.

Patent Abstracts of Japan, and English machine translation of Japanese Publication 2004-126847, listed above, 9 pages, Apr. 2004.

Patent Abstracts of Japan, and English machine translation of Japanese Publication 2004-126849, listed above, 9 pages, Apr. 2004.

\* cited by examiner

BATTERY MODULE

CROSS-REFERENCE TO RELATED APPLICATION

This application claims priority to and the benefit of Korean Patent Application Nos. 10-2004-0086602 and 10-2004-0086603, both filed with the Korean Intellectual Property Office on Oct. 28, 2004, the entire contents of which are incorporated herein by reference.

BACKGROUND OF THE INVENTION

1. Field of the Invention

The present invention relates to a battery module, and more particularly, to a battery module capable of holding partition walls at fixed installation positions and enhancing an engaging force of the unit batteries within a case.

2. Related Art

Generally, secondary batteries are rechargeable and can be repeatedly used. In particular, secondary batteries including only one battery cell are mainly used for various small portable electronic apparatuses, such as cellular phones, laptop computers, cameras, and camcorders. High-capacity secondary batteries (hereinafter referred to as a 'battery module') are formed by connecting a plurality of battery cells (hereinafter referred to as 'unit batteries'), and are mainly used as power sources for driving motors, such as, for example, motors for hybrid electric vehicles (HEVs), electrical vehicles (EVs), and the like.

Each of the unit batteries constituting the battery module includes: an electrode assembly having a positive plate, a negative plate, and a separator serving as an insulator interposed therebetween, a case having a space for accommodating the electrode assembly, a cap assembly combined with the case to tightly close the case, and positive and negative terminals protruding from the cap assembly and electrically connected to the positive plate and the negative plate, respectively.

Further, when the respective unit batteries are generally prismatic batteries, a positive terminal and a negative terminal of one unit battery protruding upward from the cap assembly are arranged so as to alternate with a positive terminal and a negative terminal of another unit battery adjacent to the one unit battery, and a conductor is connected between the threaded positive and negative terminals to be fixed thereto with nuts, thereby forming a battery module.

Since the battery module is constructed by connecting several or tens of unit batteries to each other, the battery module has a problem in that its overall volume is increased because the typical battery module needs a cooling structure, a safety means, a system circuit, etc., which are adapted to be easily capable of radiating heat generated in each unit battery.

In order to solve the problem, a method of reducing the size of the battery module by reducing the interval between the unit batteries is used, but this causes another problem in that it is difficult to radiate the heat generated in the unit batteries.

Thus, a structure capable of easily radiating the heat generated in respective unit batteries as well as being capable of minimizing the volume of a battery module at the time of designing the battery module is needed. If the heat generated in the respective unit batteries cannot be efficiently radiated, this will increase the temperature which will result in malfunction of apparatuses to which the battery module is applied.

Particularly, it is of primary importance to radiate heat in high-output and high-capacity battery modules for HEVs, EVs, and the like. If the size of the battery modules is increased, there is a problem in that not only the weight of the battery modules increases but also the design of the apparatuses (particularly, vehicles) equipped with the battery modules becomes complex.

Therefore, the development of battery modules capable of improving heat radiation characteristics while minimizing their size in battery modules required to have high output and high capacity becomes significant in modern battery practice.

Also, in a conventional battery module, spaces are provided between respective unit batteries for circulation of cooling air. Partition walls are installed for preventing structural deformation of the unit batteries. End plates are installed at opposite ends of the battery module. The unit batteries and the partition walls are supported by fixing the end plates using elongated restraint rods.

However, such a conventional battery module has problems in that, when an external force is applied, nonuniform deformation may occur in the battery module, which may lower reliability of the battery module, making it difficult to hold installation positions of the partition walls (interval between the partition walls) constant, and to prevent positional movement of the unit batteries.

SUMMARY OF THE INVENTION

The present invention provides a battery module capable of keeping installation positions of partition walls constant and capable of inducing uniform deformation of the partition walls and a case, by securely fixing the partition walls within the case or by forming the partition walls integrally with the case.

The present invention also provides a battery module capable of preventing the positional movement of the battery units by forming a battery fixing structure to improve the engaging force between the case and the unit batteries or between the case and the partition walls.

A battery module according to one aspect of the present invention includes a case with at least one face which is opened, a plurality of partition walls fixedly installed at predetermined intervals in the case, and a plurality of unit batteries which are separated from each other with the partition walls therebetween to be inserted into the case.

The case has a pair of supporting plates located so as to face to each other at opposite sides of the case, and which are arranged parallel to the partition walls, and a pair of side plates which are connected with the supporting plates at their opposite ends to integrally fix opposite edges of each of the partition walls and which are arranged perpendicular to the partition walls.

The partition walls may be integrally formed with the side plates of the case. Further, the interval between the adjacent partition walls is set to be equal to the thickness of each of the unit batteries.

The battery module may further include a fixing portion formed so as to protrude from one edge of each of the supporting plates of the case, and a fixing rod installed so as to connect the fixing portions of both of the supporting plates to each other to support them.

The battery module may further includes partition wall fixing grooves formed at predetermined intervals on the inner surfaces of the side plates of the case such that the partition walls are inserted thereinto.

In this case, the thickness of the partition walls may be set to be smaller than the external width of each of the partition wall fixing grooves. Also, the battery module may further include battery fixing grooves formed at predetermined intervals on the inner surfaces of the side plates of the case such that the unit batteries are inserted thereinto.

A plurality of projections may be formed on the partition walls so as to maintain predetermined gaps between the unit batteries.

The battery module according to another aspect of the present invention includes a battery fixing structure which is installed between the case and the unit batteries to fix the unit batteries so as to prevent the positional movement of the unit batteries from the case. The battery fixing structure may be a concavo-convex engaging structure including fixing projections and projection receiving portions.

The battery fixing structure may have fixing projections formed so as to protrude from the side faces of the unit batteries which face the case and cutouts formed at positions of the side plates of the case corresponding to the fixing projections.

Further, the battery fixing structure may have fixing projections formed so as to protrude from the side faces of the unit batteries which face the case and fixing grooves formed at positions of the side plates of the case corresponding to the fixing projections such that the fixing projections are inserted thereinto.

Moreover, the battery fixing structure may have fixing grooves formed on the side faces of the unit batteries which face the case and fixing projections protrudingly formed at positions of the side plates of the case corresponding to the fixing grooves.

The battery fixing structure may be formed between the side faces of the unit batteries which face the partition walls and the partition walls.

All the above battery modules may be used for driving a motor.

According to the battery module of the present invention as described above, since the battery module is formed and assembled with the partition walls and the case securely fixed, installation positions and alignment of the partition walls can be kept constant, thereby improving the assembling quality of the unit batteries.

Also, since the partition walls are connected to each other by the side plates of the case to form a single structure, if an external force is applied, uniform deformation is induced as a whole, so that safety can be improved and irregular changes in characteristics can be prevented.

In addition, since the projections can be formed on the partition walls or the gaps can be formed between the partition walls and the unit batteries, the heat generated in the unit batteries can be efficiently radiated, and the reliability of the batteries can be improved.

According to the battery module of the present invention, since the fixing projections are inserted into cutout portions or fixing grooves and are fixed thereto when the unit batteries are assembled into the case, the positional movement of the unit batteries can be effectively prevented, and it is also possible to prevent occurrence of problems that an operator may be injured or the unit batteries may be damaged when the unit batteries are dropped.

In addition, since the assembling work is finished simply by inserting the unit batteries into spaces between the case and the partition walls, the work time can be shortened and the productivity can be greatly improved.

DETAILED DESCRIPTION

Figure 1:
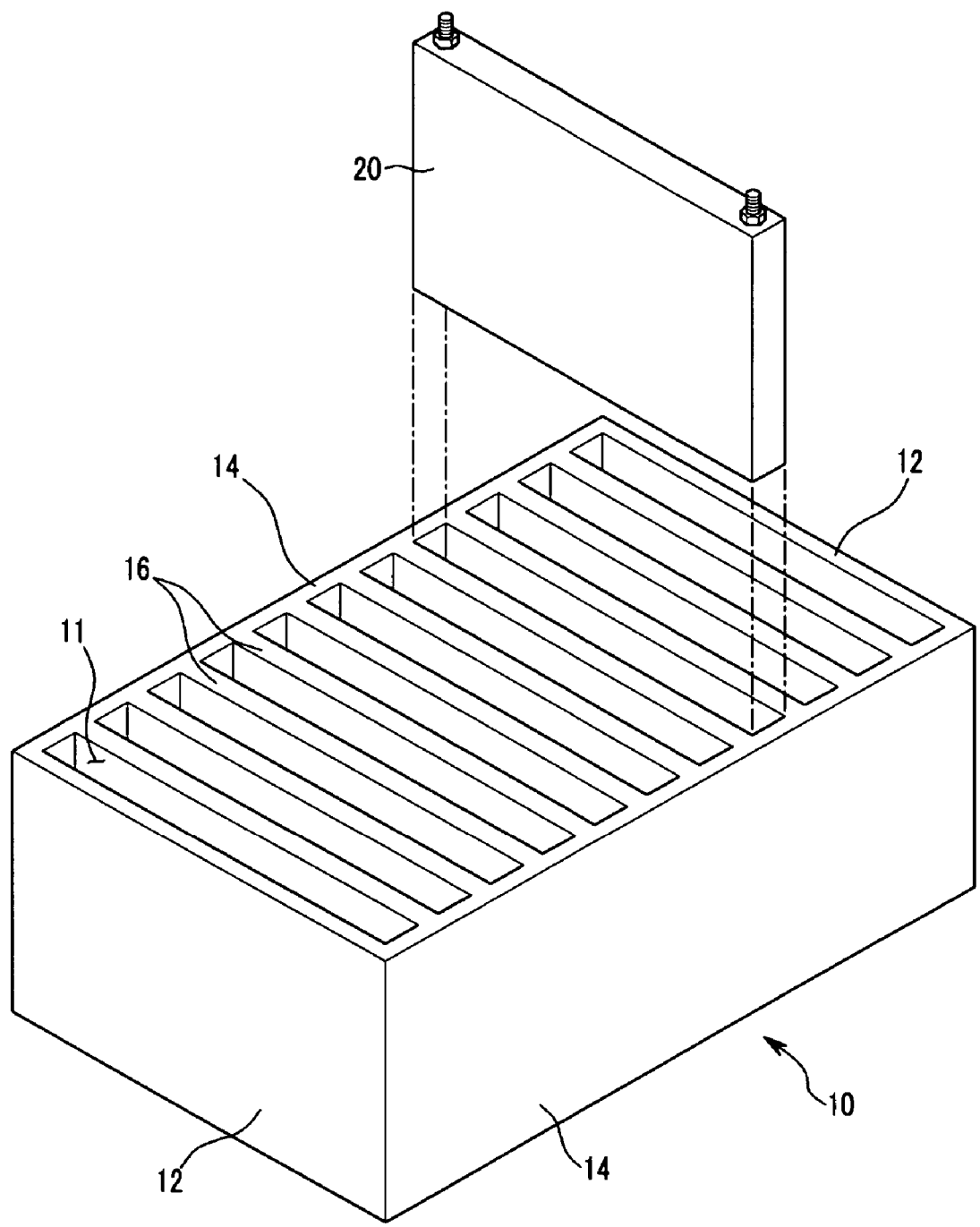
FIG. 1 is an exploded perspective view showing a battery module according to a first embodiment of the present invention.
Figure 2:
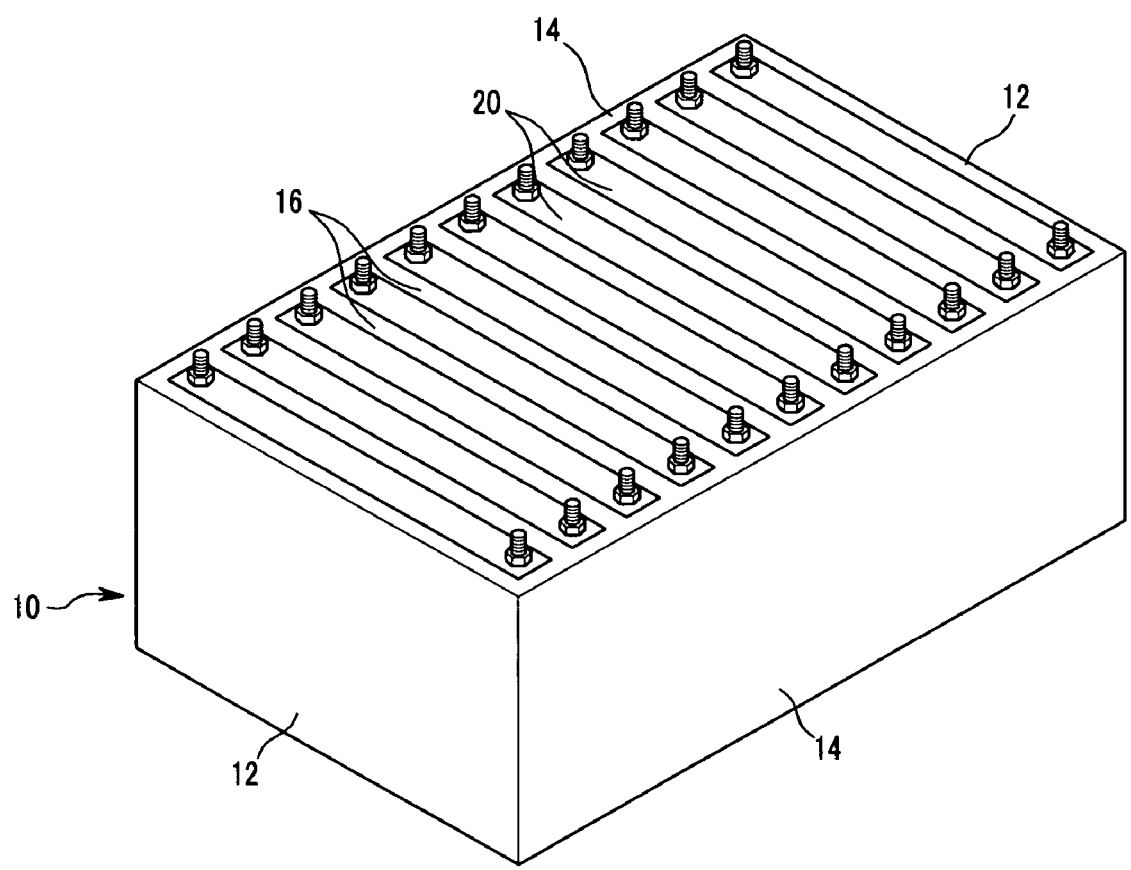
FIG. 2 is a perspective view showing a state in which unit batteries are inserted into a case of the battery module according to the first embodiment of the present invention.

Referring now to FIGS. 1 and 2, the battery module according to the present embodiment includes a box-shaped case 10, at least one face of which is opened, a plurality of partition walls 16 which are integrally formed at regular intervals within the case 10, and a plurality of unit batteries 20 separated from each other with the partition walls 16 therebetween to be inserted into the case 10.

As the plurality of partition walls 16 are installed at regular intervals within the case 10 as described above, spaces 11 are formed between the partition walls 16 so that the unit batteries 20 are inserted thereinto.

The case 10 has a pair of supporting plates 12 formed so as to face to each other at both sides of the case, and a pair of side plates 14 which are connected with the supporting plates 12 at their both ends to integrally fix both edges of each of the partition walls 16. The supporting plates 12 of the case 10 are installed parallel to the partition walls 16, and the side plates 14 are installed perpendicular to the partition walls 16.

The interval between the adjacent partition walls 16 can be set to be equal to the thickness of each of the unit batteries 20.

The remaining one face (a bottom face, not shown) of the case 10 can be closed to prevent the positional movement of the unit batteries 20 inserted into the spaces 11 between the partition walls 16.

Figure 3:
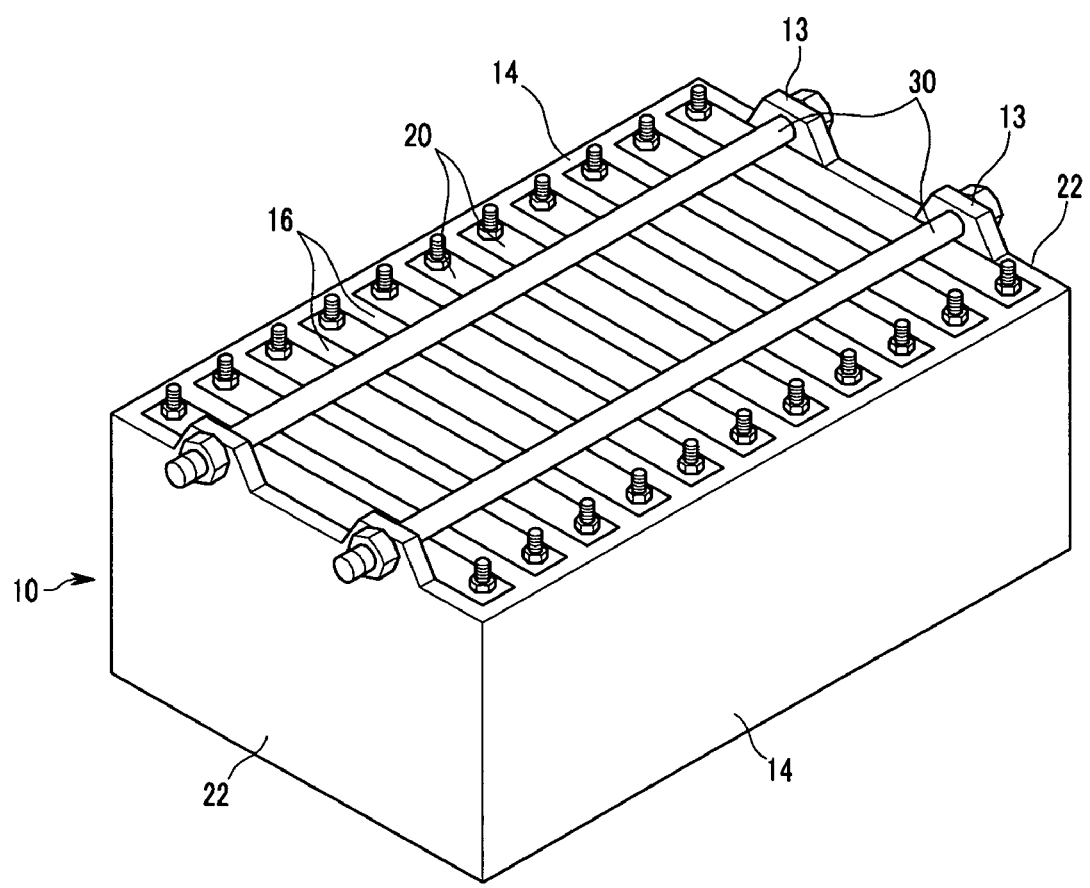
FIG. 3 is a perspective view showing a battery module according to a second embodiment of the present invention.

FIG. 3 is a perspective view showing a battery module according to a second embodiment of the present invention. Fixing portions 13 are formed so as to protrude from one (upper) edge of each of the supporting plates 22 of the case 10, and fixing rods 30 with associated coupling nuts at each end are installed so as to connect the fixing portions 13 of both the supporting plates 22 to each other to support them. One fixing portion 13 may be formed at the center of each of the supporting plates, and two or more fixing portions may be formed with a predetermined distance therebetween.

As described above, when the fixing portions 13 are formed and the fixing rods 30 are installed, the supporting strength for supporting the unit batteries 20 can be greatly enhanced, and any deformation when an external force is applied can be minimized. Also, the fixing rods 30 may be used as handgrips when the battery module is carried and moved.

Although the above embodiment has been described having a configuration in which the fixing portions 13 and the fixing rods 30 are installed only on the top side, the present invention is not limited thereto. For example, it is possible to adopt a configuration in which the unit batteries 20 are supported by forming the case 10 with its bottom face removed, and installing the fixing portions 13 and the fixing rods 30 on the bottom side as well.

Since the same battery installation configuration as the first embodiment can also be embodied in the above-described second embodiment, its detailed description will be omitted.

Figure 4:
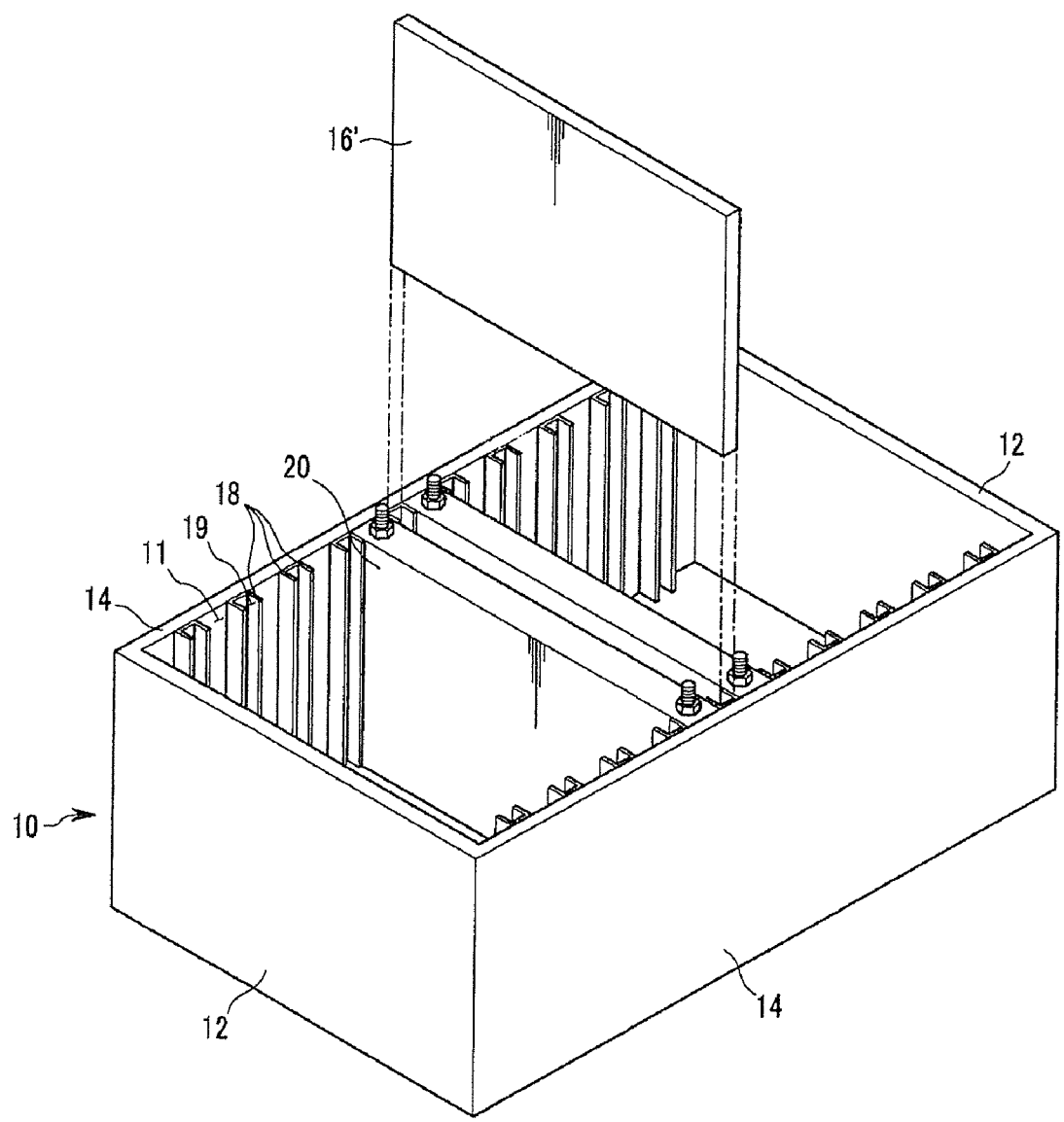
FIG. 4 is an exploded perspective view showing a battery module according to a third embodiment of the present invention.

FIG. 4 is an exploded perspective view showing a battery module according to a third embodiment of the present invention. Partition wall fixing grooves 19 for allowing the insertable partition walls 16' to be inserted thereinto are formed at regular intervals on the inner surfaces of the side plates 14 of the case 10 of the battery module according to the present embodiment. These partition wall fixing grooves 19 may be formed by fixedly installing U-shaped guide rails 18 in the side plates 14 of the case 10.

By inserting the insertable partition walls 16' into the partition wall fixing grooves 19 formed by the guide rails 18, the partition walls 16' can be securely fixed within the case 10.

Alternatively, the guide rails 18 may be formed as separate members and then attached onto the surfaces of the side plates 14 of the case 10, or may be formed so as to protrude integrally from the side plates 14 of the case 10.

In the above configuration, the thickness of opposite ends of each of the partition walls 16' to be inserted into the partition wall fixing grooves 19 of the guide rails 18 is set such that the ends are securely fitted into the fixing grooves 19, thereby preventing the partition walls 16' from being detached from the fixing grooves 19.

In an exemplary embodiment both the ends of the partition walls 16' and the partition wall fixing grooves 19 may be formed in complementary dove-tail shapes. Also, both the ends of the partition walls 16' and the partition wall fixing grooves 19 may be formed in a round shape such as a semi-circular shape or a circular-arc shape.

When the thickness of the partition walls 16' is set to be smaller than the external width of the guide rails 18, gaps may be defined between the partition walls 16' and the unit cells 20 by the thickness of the guide rails 18 forming the partition wall fixing grooves 19 to allow heat radiation therethrough.

Since the same battery installation configuration as the first and second embodiments can also be embodied in the above-described third embodiment, its detailed description will also be omitted.

Figure 5:
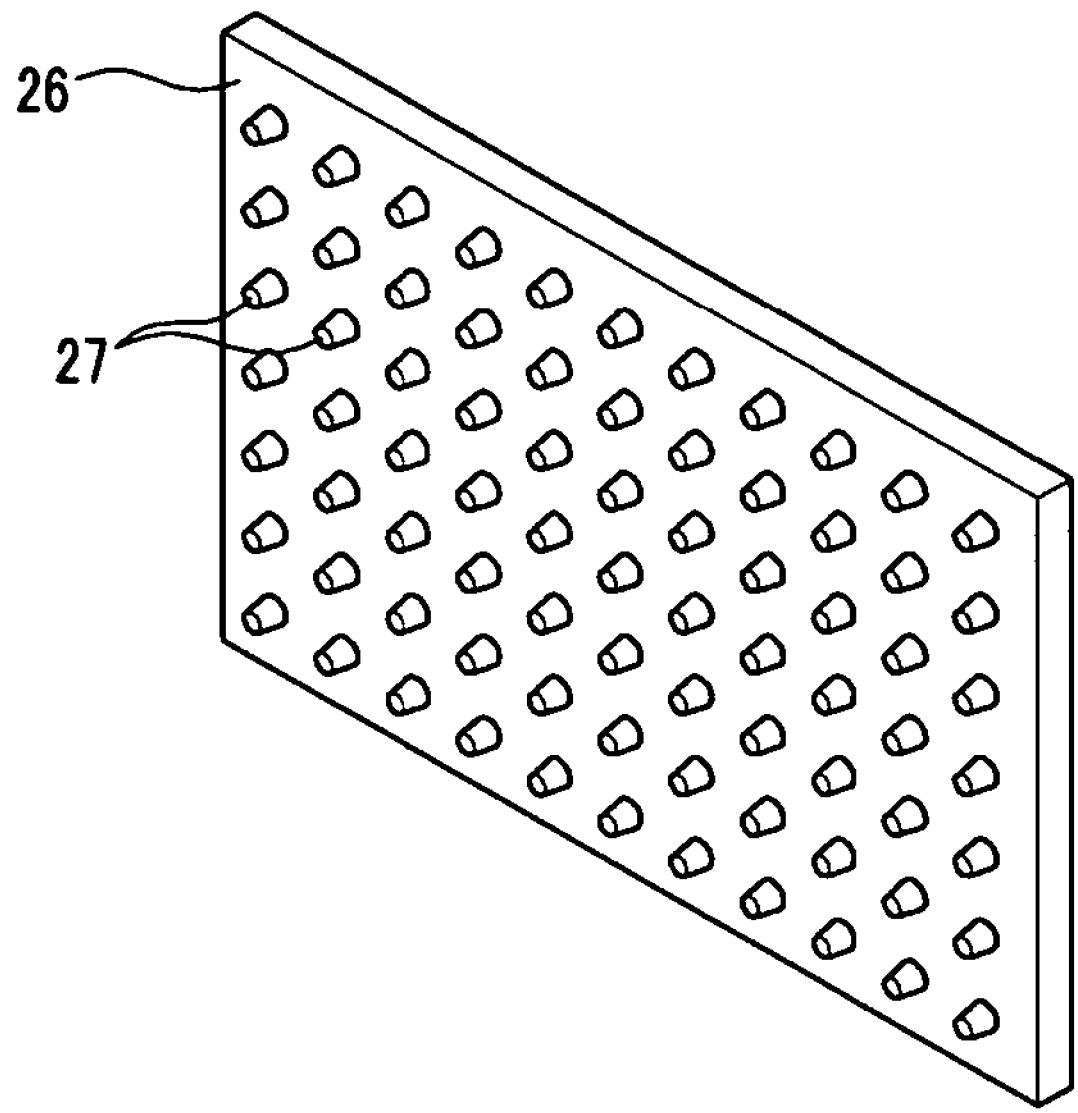
FIG. 5 is a perspective view showing another example of the partition walls applied to the embodiments of the present invention.

FIG. 5 is a perspective view showing another exemplary embodiment of partition walls applied to the embodiments of the present invention. For the first to third embodiments, a plurality of projections 27 may be formed on the partition walls 26 so as to maintain predetermined gaps between the unit batteries 20.

The projections 27 may be formed as a separate member and then attached on the partition wall 26, or may be formed integrally on the partition walls 26. The projections 27 may be formed integrally on the partition walls 26 by embossing, drawing or the like. Also, the projections 27 may be formed only on one side of each of the partition walls 26 or may be formed on both sides thereof.

When the projections 27 are formed on the partition walls 27, heat radiation can be effectively performed due to the existence of the gaps between the partition walls 26 and the unit batteries 20, as well as improving the strength of the partition walls 26.

Figure 6:
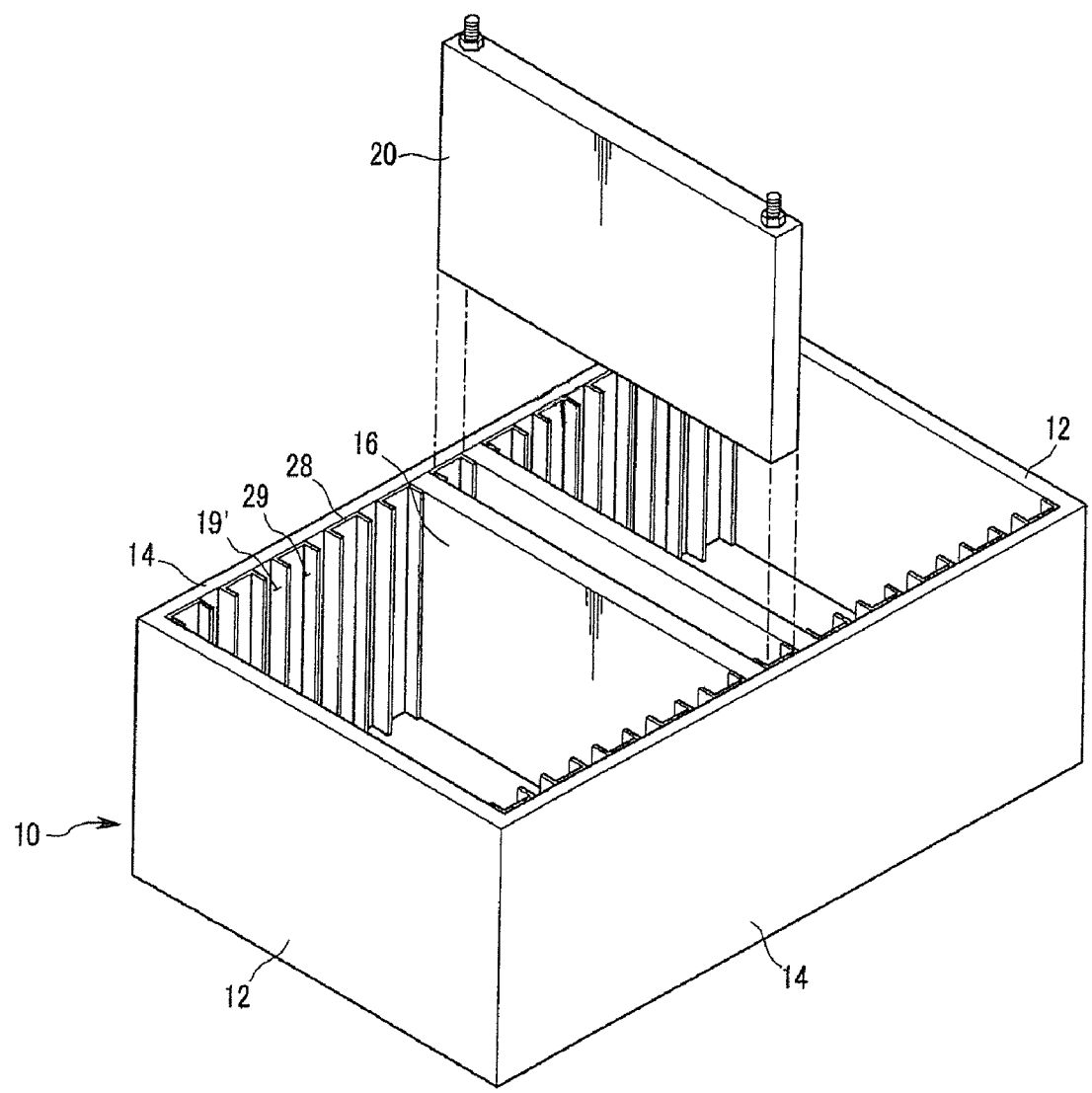
FIG. 6 is an exploded perspective view showing a battery module according to a fourth embodiment of the present invention.

FIG. 6 is an exploded perspective view showing a battery module according to a fourth embodiment of the present invention. In the battery module according to the present embodiment, battery fixing grooves 29 for allowing the unit batteries 20 to be inserted thereinto are formed at regular intervals on the inner surfaces of the side plates 14. These battery fixing grooves 29 may be formed by fixedly installing with U-shaped guide rails 28 in the side plates 14 of the case 10.

Alternatively, the guide rails 28 may be formed as separate members and then attached on the inner surfaces of the side plates 14 of the case 10, or may be formed so as to protrude integrally from the side plates 14 of the case 10.

By forming the guide rails 28 as described above and inserting the partition walls 16 into partition wall fixing grooves 19' formed between adjacent guide rails 28, the partition walls 16 can be securely fixed within the case 10.

In an exemplary embodiment the width of the partition wall fixing grooves 19' (the spacing between adjacent guide rails 28) is set to a dimension equal to the thickness of the partition walls 16. Also, the width of the partition wall fixing grooves 19' is set such that the partition walls 16 are securely fitted into the grooves, thereby preventing the partition walls 16 from being deviated from the grooves.

Also, the width of the battery fixing grooves 29 is set such that the unit batteries 20 are securely fitted into the battery fixing grooves 29, thereby preventing positional movement of the unit batteries 20.

As described above, when the unit batteries 20 are inserted into the battery fixing grooves 29 and the partition walls 16 are inserted into the partition wall fixing grooves 19' between the guide rails 28, gaps may be defined between the partition walls 16 and the unit cells 20 by the thickness of the guide rails 28 to allow heat radiation therethrough.

Since the same battery installation configuration as the first and second embodiments can also be embodied in the above-described fourth embodiment, its detailed description will be omitted.

Figure 7:
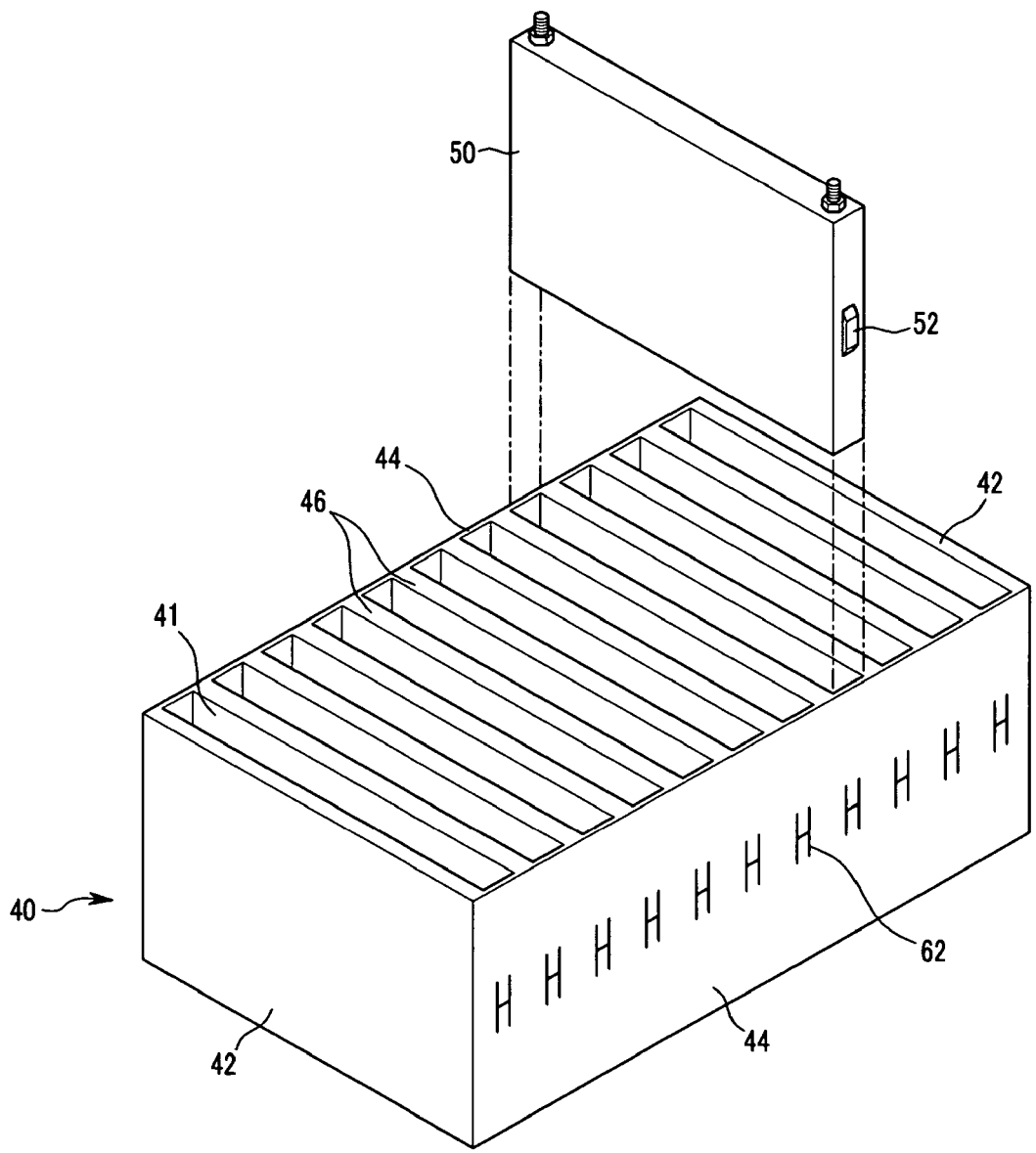
FIG. 7 is an exploded perspective view showing a battery module according to a fifth embodiment of the present invention.
Figure 8:
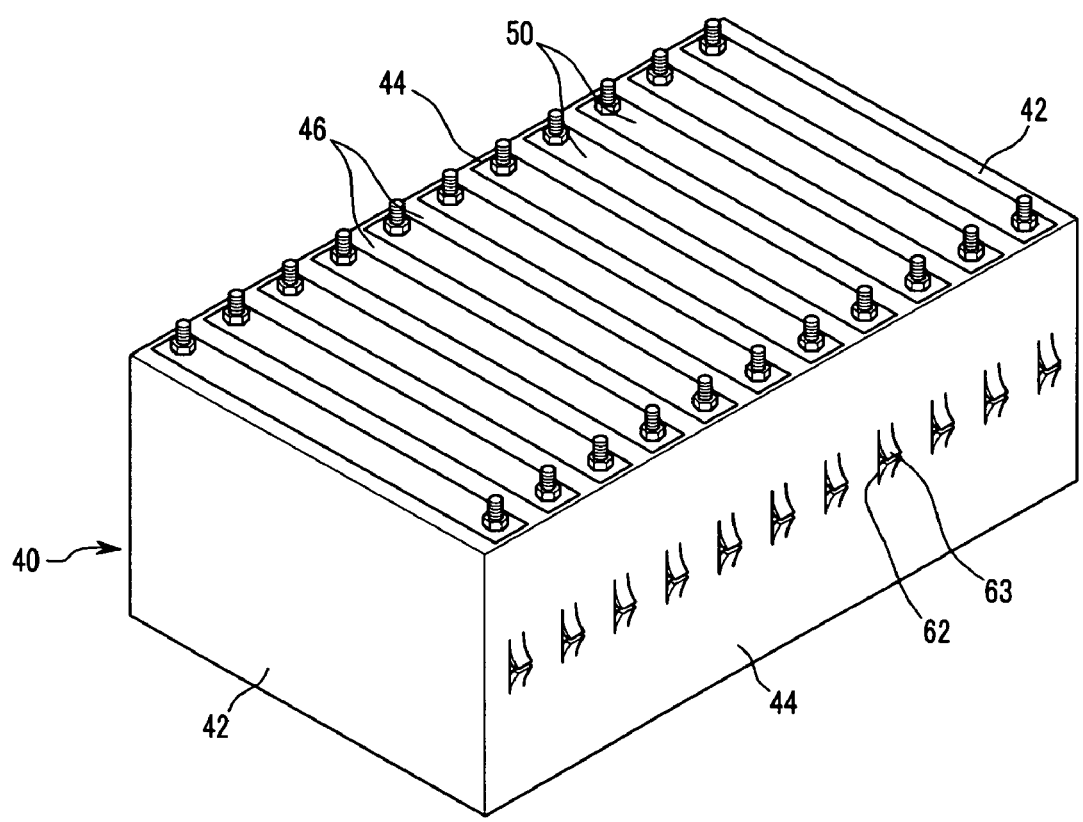
FIG. 8 is a perspective view showing a state in which unit batteries are inserted into a case of the battery module according to the fifth embodiment of the present invention.

FIG. 7 is an exploded perspective view showing a battery module according to a fifth embodiment of the present invention, and FIG. 8 is a perspective view showing a state in which unit batteries are inserted into a case of the battery module according to the fifth embodiment of the present invention. The battery module according to the present embodiment includes a box-shaped case 40, at least one face of which is opened, a plurality of partition walls 46 fixedly installed at regular intervals within the case 40, and a plurality of unit batteries 50 which are separated from each other with the partition walls 46 therebetween, and a battery fixing structure which is installed between the case 40 and the unit batteries 50 to fix the unit batteries 50 so as to prevent positional movement of the unit batteries from the case 40. This battery fixing structure may be a concavo-convex engaging structure including fixing projections and projection receiving portions.

As the plurality of partition walls 46 are located (or installed) at regular intervals within the case 40, spaces 41 are formed between the partition walls 46 for allowing the unit batteries 50 to be inserted thereinto.

The case 40 is composed of a pair of supporting plates 42 located at opposite ends in the direction in which the partition walls 46 are arranged, and a pair of side plates 44 which join the supporting plates 42 to each other on their opposite sides to integrally fix opposite edges of each of the partition walls 46. The supporting plates 42 of the case 40 are installed parallel to the partition walls 46, and the side plates 44 are installed perpendicular to the partition walls 46.

It is noted from the above that the interval between the partition walls 46 can be set to be equal to the thickness of each of the unit batteries 50.

In order to effectively radiate the heat generated in the unit batteries 50, the projections as shown in FIG. 5 may be formed on the partition walls 46 so that a predetermined gap can be maintained from the unit batteries 50.

The remaining one face (bottom face, not shown) of the case 40 can be closed to prevent positional movement of the unit batteries 50 inserted into the spaces 41 between the partition walls 46.

Figure 9:
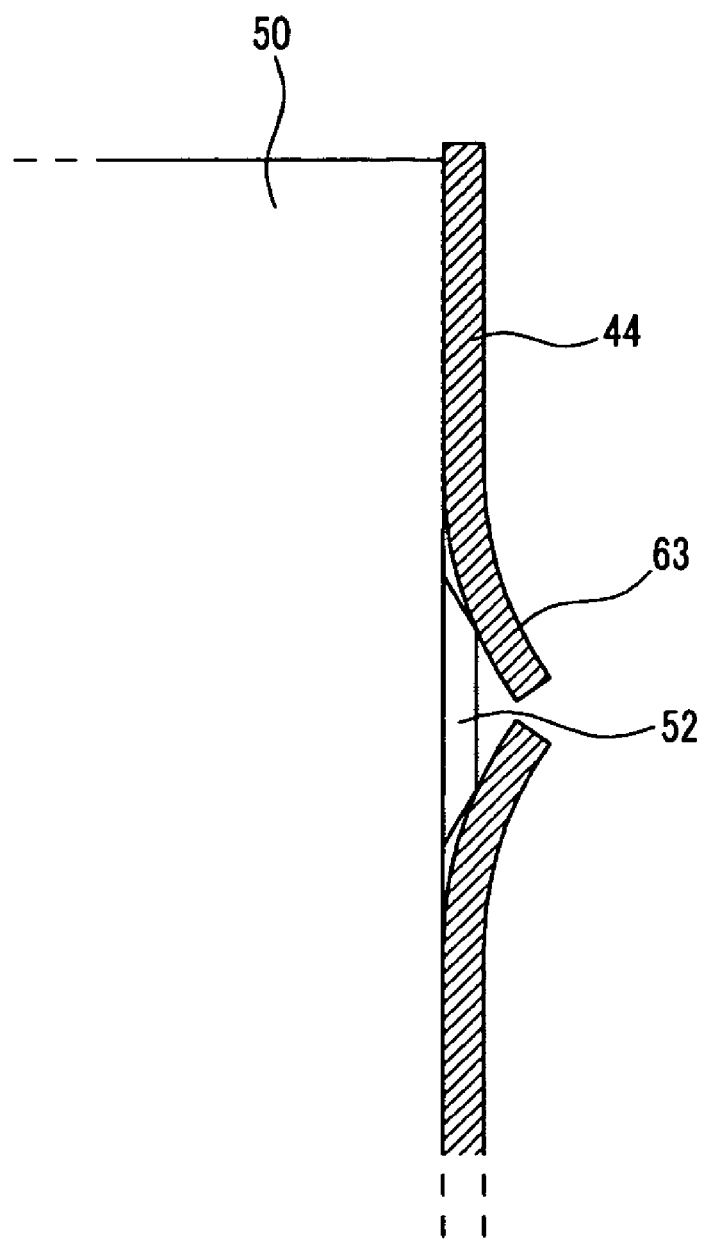
FIG. 9 is an enlarged sectional view showing a battery fixing structure of the battery module according to the fifth embodiment of the present invention.

FIG. 9 is an enlarged sectional view showing a battery fixing structure of a battery module according to a fifth embodiment of the present invention.

As shown in FIGS. 7 and 9, the battery fixing structure has fixing projections 52 formed so as to protrude from the side faces of the unit batteries 50 which face the case 40 and, in particular, cutouts 62 formed at positions of the side plates 44 of the case 40 corresponding to the fixing projections 52. Cutouts 62 may be formed by cutting the case in the shape of the letter "H".

In an exemplary embodiment at least front faces of the fixing projections 52 in their insertion direction may be formed having inclined surfaces so that the fixing projections can be easily inserted. Accordingly, the fixing projections 52 may have trapezoidal side faces, or otherwise may have side faces in various shapes, such as a rectangular shape, a triangular shape, a semicircular shape, and a semispherical shape.

In an exemplary embodiment the side plates 44 of the case 40 on which the cutouts 62 are formed are made of a material having a predetermined elastic force to hold a fastening force (supporting force) to the fixing projections 52.

The procedure of assembling the battery module when the battery fixing structure is formed as in FIGS. 7 to 9 will now be described.

First, when the unit batteries 50 are inserted into the spaces 41 formed between the partition walls 46 of the case 40, the fixing projections 52 reach the cutouts 62. Then, cutout pieces 63 are pushed outwardly while the cutouts 62 are spread by the protruding fixing projections 52. Then, the fixing projections 52 are located at the centers of the cutouts 62. At this time, the cutout pieces 63 are maintained in close contact with the fixing projections 52 due to a predetermined elastic force to prevent the positional movement of the unit batteries 50.

Figure 10:
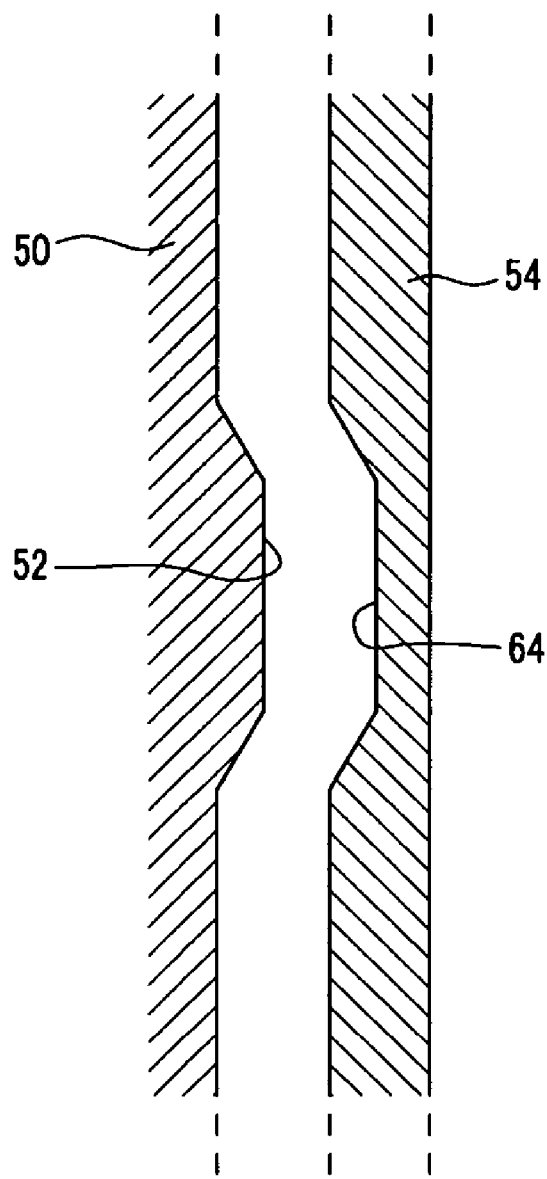
FIG. 10 is an enlarged sectional view showing a battery fixing structure of a battery module according to a sixth embodiment of the present invention.

FIG. 10 is an enlarged sectional view showing a battery fixing structure of a battery module according to a sixth embodiment of the present invention. In the battery fixing structure according to the present embodiment, fixing projections 52 are formed so as to protrude from the side faces of the unit batteries 50 which face the case 40, and fixing grooves 64 are formed at positions of the side plates 54 of the case 40 corresponding to the fixing projections 52 for allowing the fixing projections 52 to be inserted thereinto.

By forming the battery fixing structure as described above, the positional movement of the unit batteries 50 can be prevented since the fixing projections 52 are inserted into the fixing grooves 64.

Figure 11:
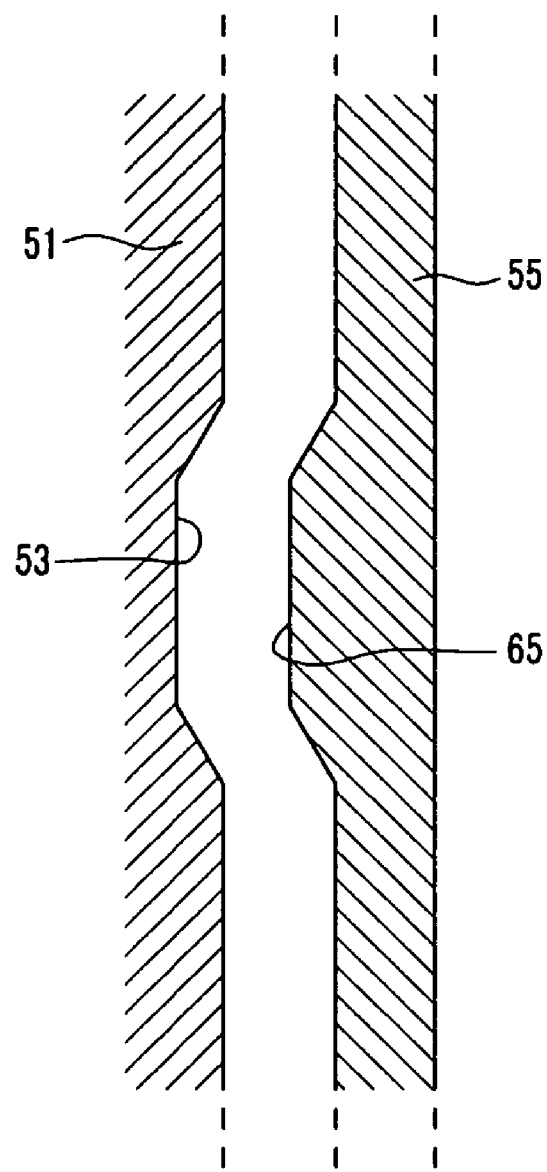
FIG. 11 is an enlarged sectional view showing a battery fixing structure of a battery module according to a seventh embodiment of the present invention.

FIG. 11 is an enlarged sectional view showing a battery fixing structure of a battery module according to a seventh embodiment of the present invention. In the battery fixing structure according to the present invention, fixing grooves 53 are formed on the side faces of the unit batteries 51 which face the case 40, and fixing projections 65 are formed at positions of the side plates 55 of the case 40 corresponding to the fixing grooves 53.

Although the above embodiments have been described with respect to the configuration in which the battery fixing structure is installed between the unit batteries and the side plates of the case, the present invention is not limited thereto. For example, the battery fixing structure may be installed between the unit batteries and the partition walls, such embodiments are shown in FIGS. 12 and 13.

Figure 12:
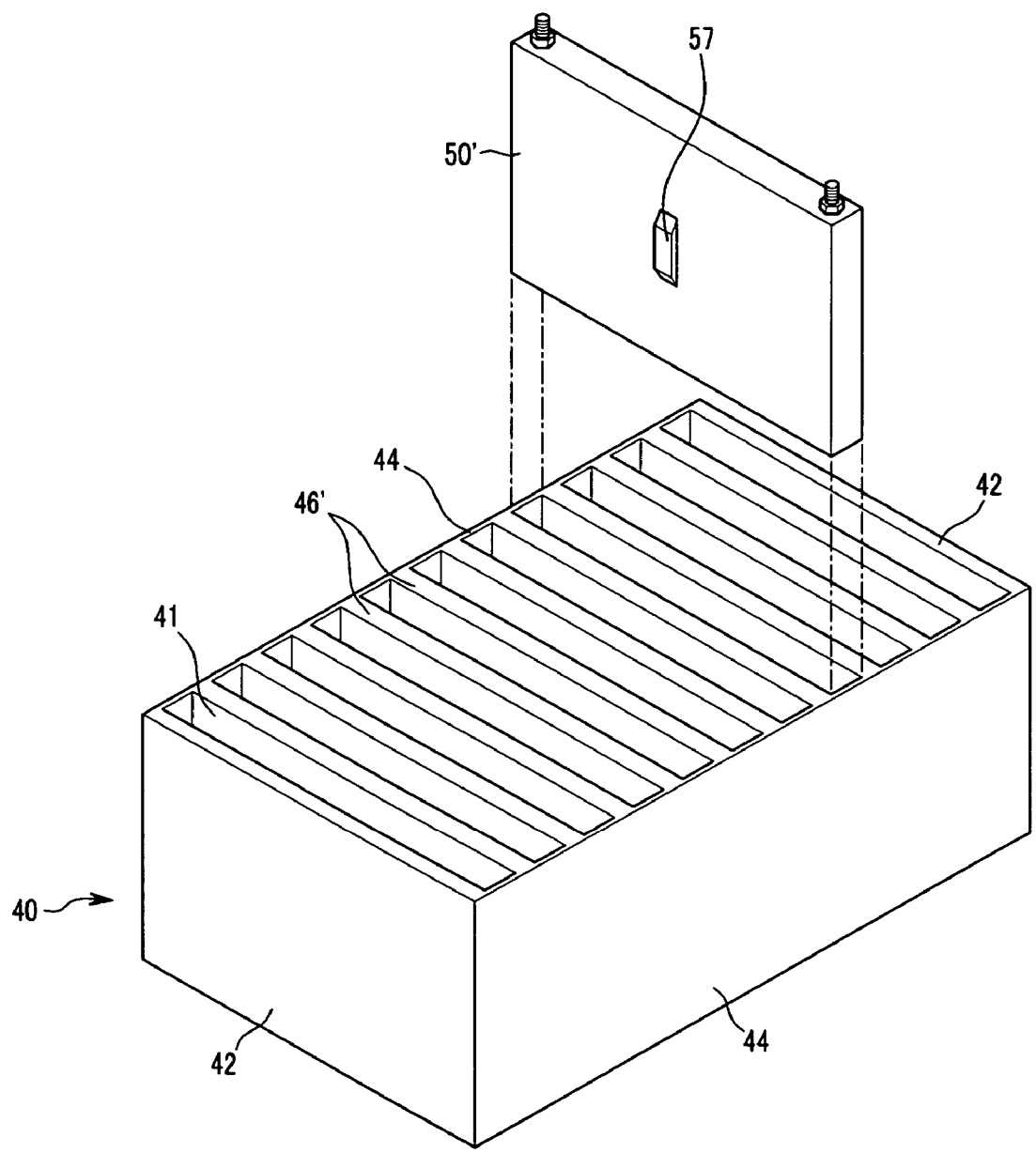
FIG. 12 is an exploded perspective view showing a battery module according to an eighth embodiment of the present invention.
Figure 13:
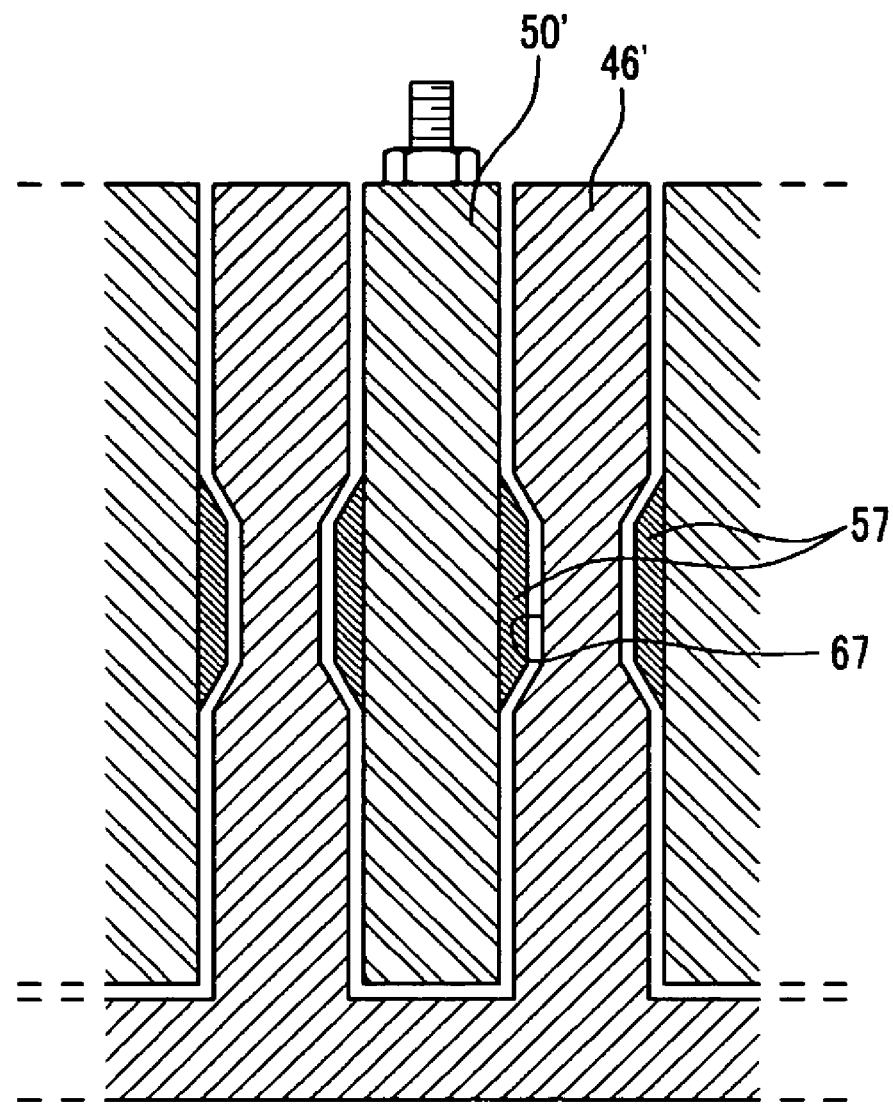
FIG. 13 is a sectional view of the eighth embodiment with the battery module in FIG. 12 assembled.

FIG. 12 is an exploded perspective view showing a battery module according to an eighth embodiment of the present invention, and FIG. 13 is a sectional view of the battery module of FIG. 12 in an assembled configuration. The battery fixing structure according to the present invention includes fixing projections 57 formed so as to protrude from the side faces of the unit batteries 50' on the side of the partition walls 46', and fixing grooves 67 formed at positions of the partition walls 46' corresponding to the fixing projections 57 for allowing the fixing projections 57 to be inserted therethrough.

In an alternative embodiment, fixing grooves may be formed on the side faces of the unit batteries which face the partition walls and fixing projections may be formed at positions of the partition walls corresponding to the fixing grooves.

In still another embodiment, the battery fixing structure may be installed not only between the unit batteries and the partition walls but also between the unit batteries and the side plates. As such, fastening of the unit batteries within the case can be even more reliably ensured.

Figure 14:
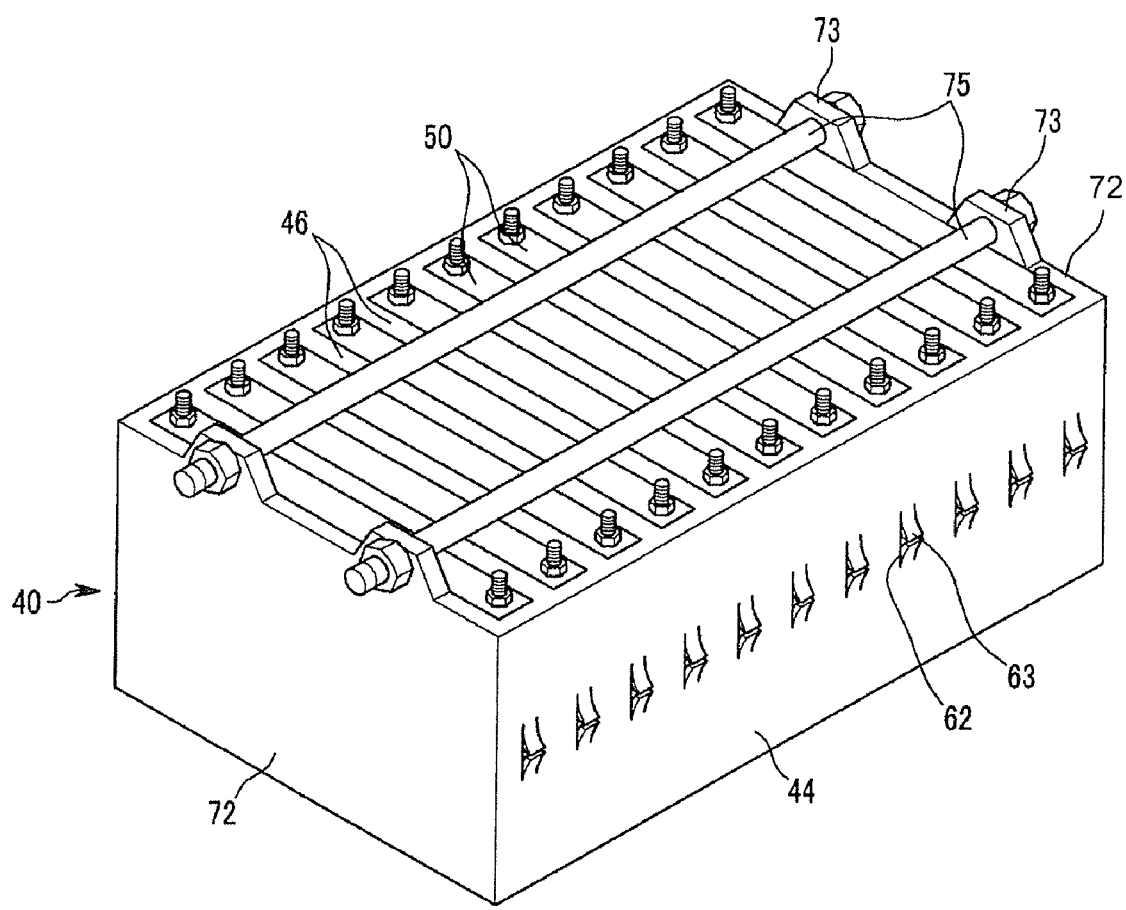
FIG. 14 is a perspective view showing a battery module according to a ninth embodiment of the present invention.

FIG. 14 is a perspective view showing a battery module according to a ninth embodiment of the present invention. In the battery module according to the present embodiment, expanding upon the embodiments shown in FIGS. 7-9, fixing portions 73 are formed so as to protrude from one (upper) edge of each of the supporting plates 72 of the case 40, and fixing rods 75 with coupling nuts are installed so as to connect the fixing portions 73 of both of the supporting plates 72 to each other to support them.

One fixing portion 73 may be formed at the center of each of the supporting plates, and two or more fixing portions may be formed with a predetermined distance therebetween.

When the fixing portions 73 are formed and the fixing rods 75 are installed, the supporting strength for supporting the unit batteries 50 can be greatly improved, and any deformation which may be caused when an external force is applied can be minimized. Also, the fixing rods 75 may be used as handgrips when the battery module is carried and moved.

Although the present embodiment has been described for a configuration in which the fixing portions 73 and the fixing rods 75 are installed only on the top side, the present invention is not limited thereto. For example, it is possible to adopt a configuration in which the unit batteries 50 are supported by forming the case 40 with its bottom face removed, and providing the fixing portions 73 and the fixing rods 75 on the bottom side as well.

Since the same battery installation configuration as the fifth to eighth embodiments can also be embodied in the above-described ninth embodiment, its detailed description will be omitted.

Figure 15:
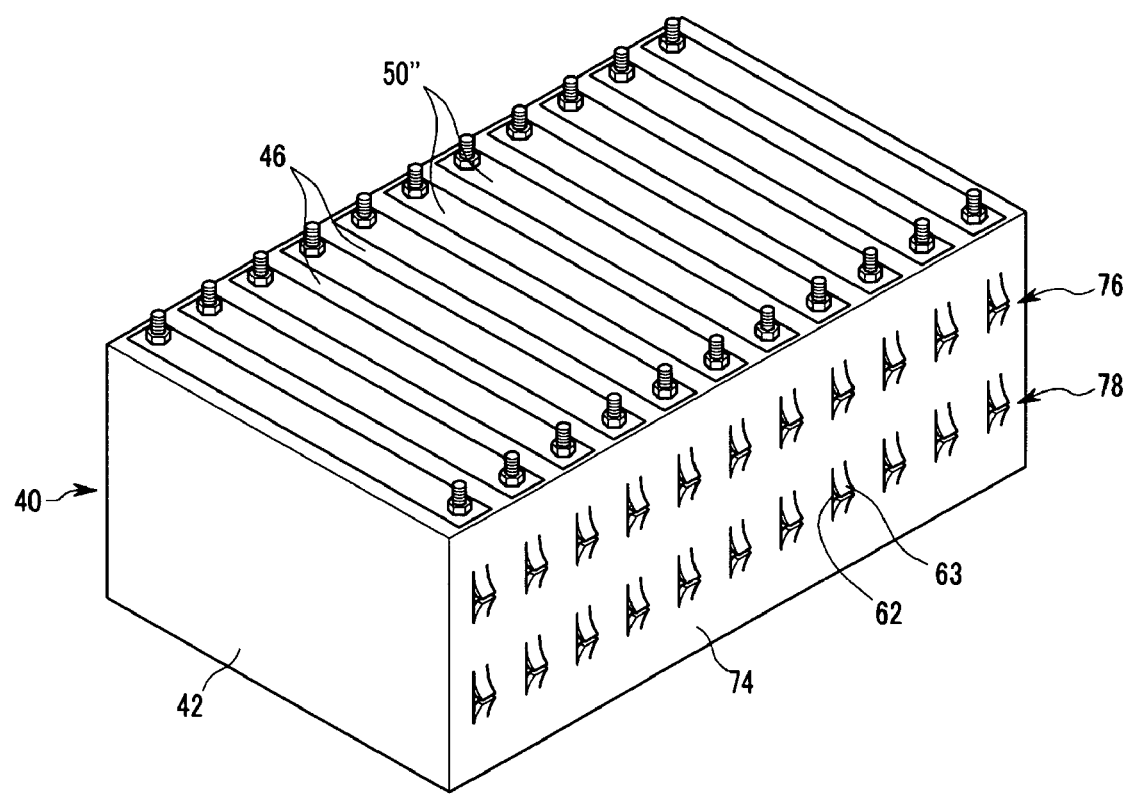
FIG. 15 is a perspective view showing a battery module according to a tenth embodiment of the present invention.

FIG. 15 is a perspective view showing a battery module according to a tenth embodiment of the present invention. Two rows of battery fixing structures are formed in the battery module according to the present embodiment.

Specifically, two rows, i.e., upper and lower rows of fixing projections 52 are formed so as to protrude from the side faces of the unit batteries 50" which face the case 40 and two rows 76, 78 of cutouts 62 and cutout pieces 63 are formed at positions of the side plates 74 of the case 40 corresponding to the fixing projections 52 and formed by cutting the case substantially in the shape of the letter "H".

Also, three more rows of the fixing projections 52 and the cutouts 62 may be formed.

Since the same battery installation configuration as the sixth to ninth embodiments can also be embodied in the above-described tenth embodiment, its detailed description will be omitted.

The battery modules according to the embodiments of the present invention configured as described above can be used as power sources for driving motors in motor-operated apparatuses, such as HEVs, EVs, cordless cleaners, electric-powered bicycles, and electric-powered scooters, and in various applications which require high output and high capacity.

Figure 16:
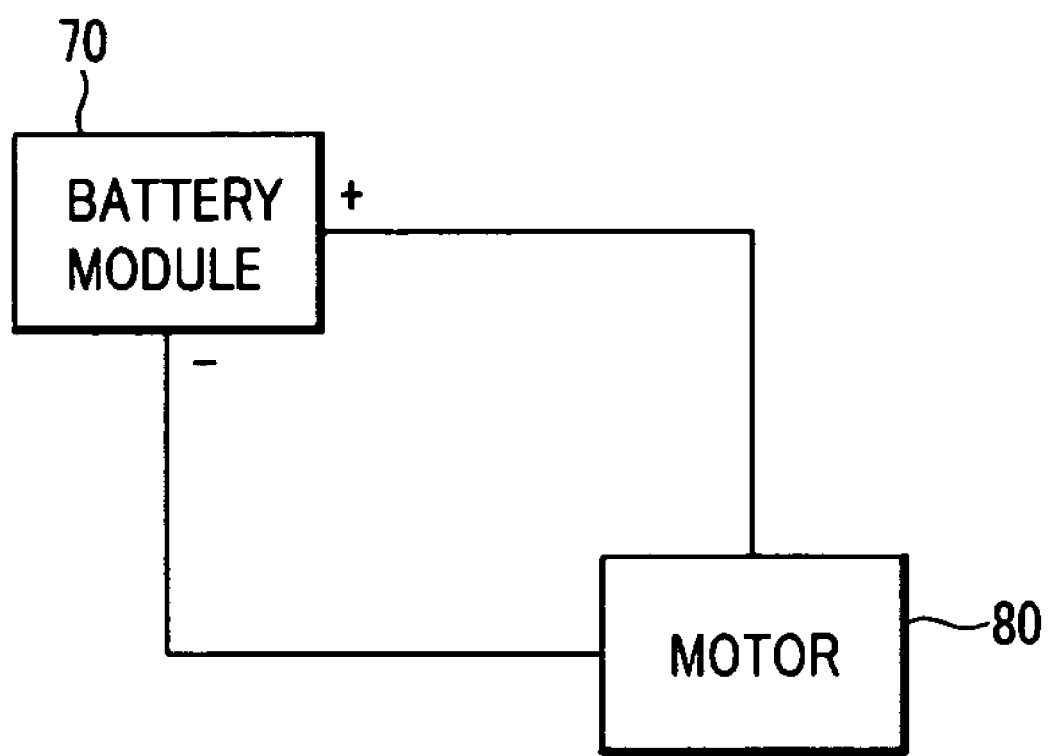
FIG. 16 is a block diagram showing an example in which the battery module is used for a driving motor.

FIG. 16 is a block diagram showing an example in which the battery module 70 is used for a driving motor 80.

Although the battery modules according to exemplary embodiments of the present invention have been shown and described, it should be appreciated by those skilled in the art that changes may be made to the disclosed embodiments without departing from the principles and spirit of the invention, the scope of which is defined in the claims and their equivalents.

What is claimed is:

1. A battery module comprising:
  a case comprising a pair of opposing side plates and a pair of opposing supporting plates and having an opening on a side substantially perpendicular to the side plates and the supporting plates;
  a plurality of partition walls spaced apart at intervals in the case;
  a plurality of unit batteries insertable into the case through the opening in an insertion direction, adjacent unit batteries being separated from each other by a partition wall of the plurality of partition walls; and
  a battery fixing structure between the case and respective unit batteries of the plurality of unit batteries, the battery fixing structure comprising a fixing projection protruding from a side face of the respective unit battery and a cutout formed through one of the opposing side plates of the case and forming a projection receiving portion,
  wherein the side face of the respective unit battery and the one of the opposing side plates of the case face a direction substantially perpendicular to the insertion direction, and
  wherein the fixing projection is insertable into the projection receiving portion for reducing positional movement of the respective unit battery in at least the insertion direction.

2. The battery module of claim 1, wherein the battery fixing structure comprises a concavo-convex engaging structure.

3. The battery module of claim 1, wherein:
  the pair of opposing supporting plates face each other at opposite sides of the case and are arranged parallel to the partition walls, and
  the pair of opposing side plates are connected with the opposing supporting plates to integrally fix opposite edges of each of the partition walls, and are arranged perpendicular to the partition walls.

4. The battery module of claim 3, wherein the fixing projections protrude from the side faces of the unit batteries facing fixing grooves formed at positions of the opposing side plates corresponding to the fixing projections, the fixing projections being insertable into respective fixing grooves.

5. The battery module of claim 3, wherein the battery fixing structure has fixing grooves formed on the side faces of the unit batteries facing fixing projections protruding at positions of the opposing side plates of the case corresponding to the fixing projections, the fixing projections being insertable into respective fixing grooves.

6. The battery module of claim 1, wherein a face of the fixing projection in the insertion direction includes an inclined surface.

7. The battery module of claim 1, wherein the battery fixing structure between the case and each of the respective unit batteries comprises at least two fixing projections and at least two projection receiving portions.

8. The battery module of claim 1, wherein the battery module drives a motor.

9. The battery module of claim 1, wherein at least a portion of the one of the opposing side plates proximate the cutout is protruded outward with respect to another portion of the one of the opposing side plates that is distal from the cutout when the fixing projection is inserted into the projection receiving portion.

10. The battery module of claim 9, wherein the portion of the one of the opposing side plates comprises a material having an elastic force for maintaining the portion of the one of the opposing side plates in contact with the fixing projection when the fixing projection is inserted into the projection receiving portion.

11. The battery module of claim 1, wherein the partition wall of the plurality of partition walls comprises projections on a surface thereof facing a unit battery of the adjacent unit batteries, and a gap is maintained between the surface of the partition wall and the unit battery of the adjacent unit batteries.

12. A battery module comprising:
  a case comprising a pair of opposing side plates and a pair of opposing supporting plates;
  a plurality of partition walls spaced apart at intervals in the case;
  a plurality of unit batteries insertable into the case, adjacent unit batteries being separated from each other by a partition wall of the plurality of partition walls; and
  a battery fixing structure between the case and respective unit batteries of the plurality of unit batteries, the battery fixing structure comprising a fixing projection protruding from a side face of the respective unit battery and a cutout formed through one of the opposing side plates of the case and forming a projection receiving portion,
  wherein the fixing projection is insertable into the projection receiving portion for reducing positional movement of the respective unit battery, and
  wherein the cutout has an "H" shape.

* * * * *